United States Patent [19]

Sakai et al.

[11] Patent Number: 4,687,915

[45] Date of Patent: Aug. 18, 1987

[54] AUTOMATIC FOCUSING DEVICE HAVING A HUNTING PREVENTION CIRCUIT

[75] Inventors: Shinji Sakai, Tokyo; Takashi Kawabata, Kanagawa, both of Japan

[73] Assignee: Canon Kabushiki Kaisha, Tokyo, Japan

[21] Appl. No.: 829,792

[22] Filed: Feb. 14, 1986

Related U.S. Application Data

[63] Continuation of Ser. No. 448,742, Dec. 10, 1982, abandoned.

[30] Foreign Application Priority Data

Dec. 18, 1981 [JP] Japan ................................. 56-205787
Dec. 18, 1981 [JP] Japan ................................. 56-205788
Dec. 18, 1981 [JP] Japan ................................. 56-205790

[51] Int. Cl.$^4$ ................................................. G03B 3/10
[52] U.S. Cl. ...................................... 250/201; 250/204; 354/402
[58] Field of Search ............... 250/201 PF, 201 AF, 250/204, 208, 209, 578; 354/402–409; 356/4

[56] References Cited

U.S. PATENT DOCUMENTS

| 4,091,275 | 5/1978 | Wilwerding | 250/201 PF |
| 4,333,007 | 6/1982 | Langlais et al. | 354/402 |
| 4,473,743 | 9/1984 | Ishikawa | 354/402 |

*Primary Examiner*—Edward P. Westin
*Attorney, Agent, or Firm*—Toren, McGeady & Associates

[57] ABSTRACT

In automatic focusing devices of the type which detect a defocus degree and a focusing direction and according to the results of detection, automatically shift a lens to an in-focus position, an accurate defocus degree cannot be obtained when the lens position is far away from an in-focus point. In such a case, focus detection must be carried out by driving the lens in the focusing direction solely according to information on the focusing direction, which, because of a weak signal from the detection output necessitates a slow lens driving speed and accordingly takes a long time for shifting the lens position to an in-focus point. Another problem with conventional devices is the possibility of overshoot which happens while bringing the lens to the in-focus point by driving it to a defocus degree. Then, after such anovershoot, the lens is again driven to the defocus degree in the reverse direction. This results in a second hunting which tends to occur before the in-focus position is attained. An automatic focusing device according to the invention solves these problems by driving the lens in the focusing direction, detected when the lens is in a position away from an in-focus point and by inhibiting the detecting action while the lens is driven. Furthermore, when overshoot once happens, the detected defocus degree is decreased and the decreased defocus degree is transmitted to a lens drive circuit driving the lens to a decreased degree in the next lens driving process to preclude the possibility of hunting.

3 Claims, 9 Drawing Figures (a) 
FOCAL POINT OBTAINED
BY ADJUSTING THE LENS     A0 (ACTUAL IN-FOCUS POINT)

(b)

(c)

(d)

IN-FOCUS POINT

1

AUTOMATIC FOCUSING DEVICE HAVING A HUNTING PREVENTION CIRCUIT

This is a continuation of application Ser. No. 448,742, filed Dec. 10, 1982, now abandoned.

BACKGROUND OF THE INVENTION

1. Field of the Invention

This invention relates to a lens drive arrangement for an automatic focusing device.

2. Description of the Prior Art

In situations where an automatic focusing device is required to perform a continuous focusing operation, a servo-like control using a motor or the like is employed as a typical lens driving method. In conventional automatic focusing devices, however, there is the probability of erroneous detection during a lens position adjusting process and such a probability increases particularly where the lens position is shifted at a high speed or where sensors of low sensitivity are used. As a result, conventional devices of this type have been compelled to drive the lens at a very low speed. Accordingly, photographers have often missed good shutter chances. Furthermore, in the servo-like control, the motor is controlled by a servo system. Generally, however, there arises an overshoot problem during control by a servo system. When the lens is driven to an in-focus point, the lens does not stop there but is apt to move to a point beyond the in-focus point. Therefore, in shifting the lens to an in-focus position under servo-like control, hunting of the lens might occur. In such a situation, the lens slowly reaches the in-focus point after moving back and forth across the in-focus point. Under the servo-like control, the lens can be brought into an in-focus position once a lens driving direction toward the in-focus point is detected. However, where more speedy and more accurate automatic focusing is desired, it is preferable to promptly shift the lens position to an in-focus point by virtue of defocus degree information.

SUMMARY OF THE INVENTION

It is an object of the invention to provide an automatic focusing device in which a lens is either driven on the basis of defocus information when the information on a defocus degree from an in-focus point is highly accurate, i.e., when the lens position is relatively close to the in-focus point, or driven to a predetermined extent when the above information is not sufficiently accurate, i.e., when the lens position is far away from the in-focus point. This arrangement permits the lens to be promptly positioned close to the in-focus point even when the lens position is far away from the in-focus point. After that, the lens position can be shifted to the in-focus point according to a defocus degree. Therefore, a focusing action can be accomplished within a short period of time.

It is another object of the invention to provide an automatic focusing device wherein information on a defocus degree and information on a focusing direction, which are detected through a focus detecting action, are utilized for increasing the shifting speed of a lens position to an in-focus point in such a manner that the lens is driven according to the defocus degree information when the defocus degree information is accurate, or is driven to a predetermined extent in the direction shown by the focusing direction information when the accuracy of the defocus degree information is low while that of the focusing direction information alone is high with the lens position being far away from an in-focus point, or is driven to a predetermined extent in a predetermined direction when both the defocus degree information and the focusing direction information are of low accuracy with the lens position being far from an in-focus point.

It is a further object of the invention to provide an automatic focusing device wherein hunting mentioned in the foregoing is prevented by reducing a detected defocus degree and by driving a lens only to the reduced defocus degree when the focusing direction information obtained through a focus detecting process shows a direction different from the direction shown by previous information obtained through a preceding focus detecting process, i.e., when overshoot once takes place.

It is still a further object of the invention to provide an automatic focusing device wherein, in carrying out the above lens shifting control according to a detected defocus degree, the lens is driven to an extent corresponding to the detected defocus degree through an extremely simple computing process.

These and further objects and features of the invention will become apparent from the following detailed description of preferred embodiments thereof taken in conjunction with the accompanying drawings.

DETAILED DESCRIPTION OF THE PREFERRED EMBODIMENTS

Figure 1:
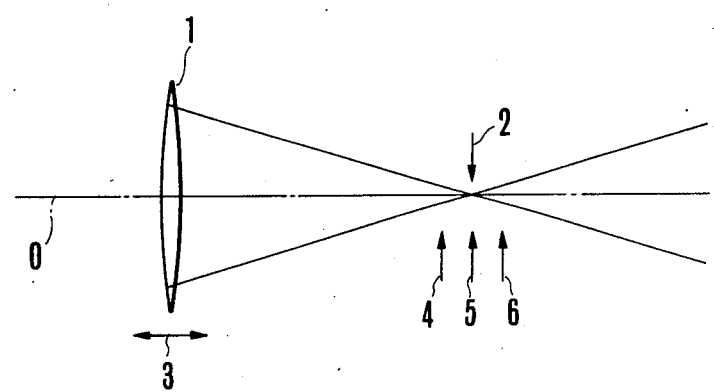
FIG. 1 is a schematic illustration of the focus detecting method of an automatic focusing device according to the present invention.

Referring to FIG. 1 which shows the focus detecting method of an automatic focusing device according to the invention, a photo-taking lens 1 is movable along an optical axis O thereof, back and forth as indicated by an arrow, to correctly form the image of an object on a predetermined imaging plane 2. To detect the focused image, images obtained at a lens position equivalent to the predetermined imaging plane 2 and at other positions located before and after the equivalent position, such as the points indicated by reference numerals 4, 5 and 6 in FIG. 1, are converted into electrical signals through sensors and are then compared. The defocus degree of the image relative to the predetermined imaging plane 2 is computed through this comparison process. The lens 1 is then moved according to the result of computation and is stopped at a proper position.

Figure 2:
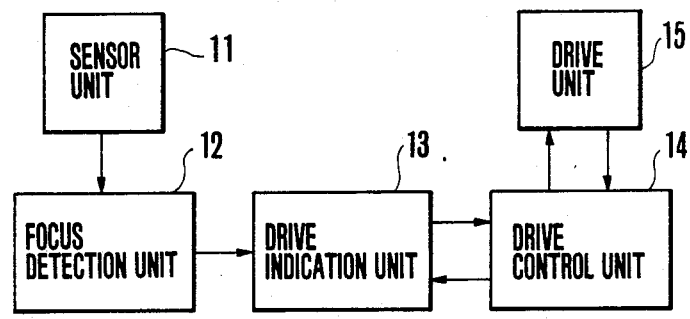
FIG. 2 is a block diagram schematically showing the arrangement of constituent units of different functions of the automatic focusing device embodying the present invention.

Referring to FIG. 2, with the images which are obtained at the positions 4, 5 and 6 converted into electrical signals at a sensor unit 11, the electrical signals are supplied to a focus detection unit 12. The focus detection unit 12 detects the defocus degree and determines whether the images thus obtained are in focus or out of focus. A drive indication or instruction unit 13 computes a driving extent required for accurately and quickly obtaining an in-focus state. Then, a drive control unit 14 controls a drive unit 15 according to the driving extent thus obtained.

Figure 3:
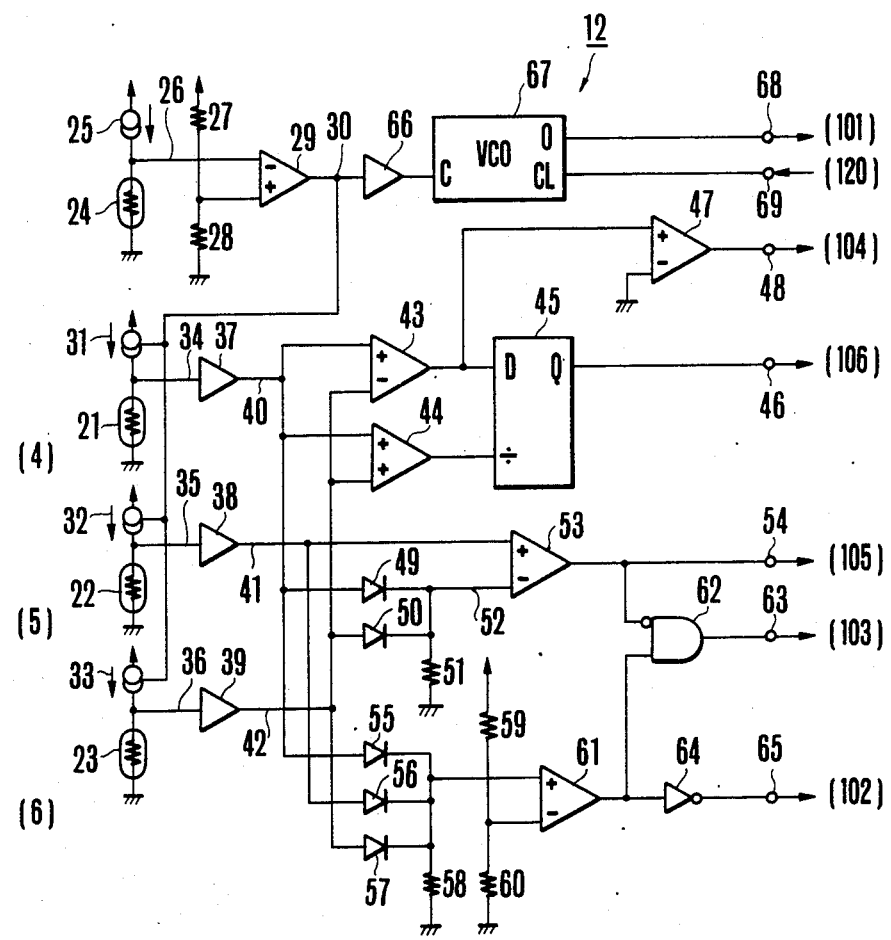
FIG. 3 is a circuit diagram showing, by way of example, a focus detection unit shown in FIG. 2.

The focus detection unit 12 is arranged as shown in FIG. 3. In FIG. 3, reference numerals 21, 22 and 23 indicate sensors which are in positions to see regions equivalent to the above positions 4, 5 and 6. Another sensor 24 sees an approximately equivalent region for the purpose of stabilizing signals by brightness. For this purpose, a constant current is supplied from a constant current circuit 25 to the sensor 24 in such a manner that a line 26 has a potential level which becomes lower as the brightness of the distance measuring region increases, that is, there is produced a signal, the level of which becomes lower as the brightness increases. This brightness signal is differentially amplified at a differential amplifier 29 relative to a reference potential determined by resistors 27 and 28 to produce in a line 30 a signal, the level of which becomes higher as the brightness increases. This signal is used to control constant current circuits 31, 32 and 33 to cause currents flowing in these circuits to increase with the brightness in such a manner that the signal level produced at each of points 34, 35 and 36 corresponds solely to image sharpness irrespective of the brightness of ambient light.

In other words, a driving current which varies with the brightness of ambient light is allowed to flow to each of the sensors 21, 22 and 23. The output level of each of the sensors 21 to 23 is thus determined solely by image sharpness irrespective of the brightness of the ambient light.

Signals representing the image sharpness obtained at a prescribed focal plane and at positions located in front and in the rear thereof are amplified by amplifiers 37, 38 and 39. Through this process, lines 40, 41 and 42 give respective sharpness signals for the position before the prescribed focal plane (or the position 4 shown in FIG. 1), the prescribed focal plane (the position 5 shown in FIG. 1) and the position after the prescribed focal plane (the position 6 shown in FIG. 1). The signal levels of the lines 40, 41 and 42 are controlled by the above amplifiers 37, 38 and 39 to increase with the sharpness. Of the three signals, the two signals of the lines 40 and 42 are supplied to a differential amplifier 43 to obtain a difference between the degrees of sharpness of images formed at the positions before and after the prescribed imaging plane 2 (the positions 4 and 6 shown in FIG. 1). At the same time, the sum of the degrees of sharpness of the images before and after the prescribed imaging plane 2 is obtained at an addition amplifier 44. The two values thus obtained are supplied to a divider 45 to rate the image sharpness of an object to be photographed by dividing the difference with the sum. Then, a signal proportional to the images obtained at the positions before and after the prescribed imaging plane 2, i.e., a signal representative of a degree of defocus is produced at a terminal 46.

Figure 4:
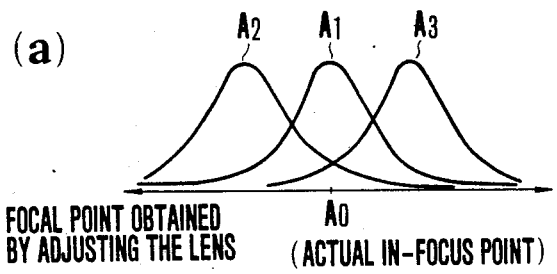
FIG. 4 is a waveform chart showing the focus detecting action of the focus detection unit shown in FIG. 3.
Figure 4:
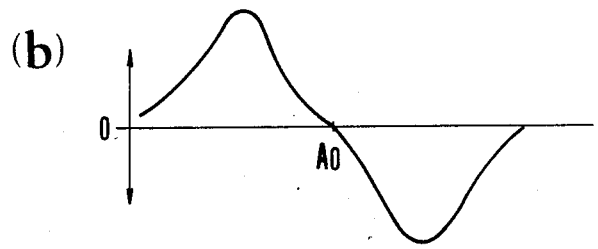
Figure 4:
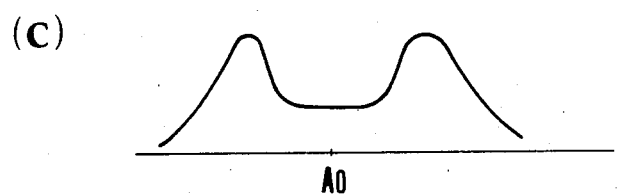
Figure 4:
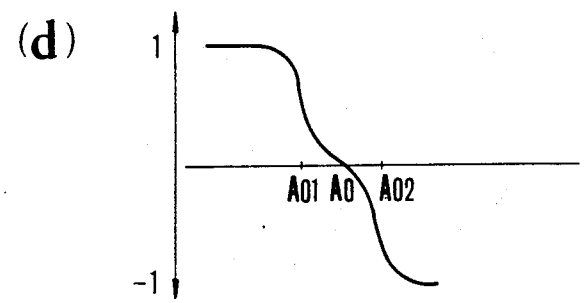

More specifically, assuming that the output of the line 41 is varying as represented by A1 in FIG. 4(a), the output (a sharpness signal) of the line 40 as represented by A2 and that of the line 42 as represented by A3 in FIG. 4(a), a difference between the outputs of lines 40 and 42 obtained by the amplifier 43 results in a signal difference which is shown in FIG. 4(b). Meanwhile, the sum of the outputs of lines 40 and 42 obtained by the amplifier 44 becomes as shown in FIG. 4(c). Therefore, with the waveform value of FIG. 4(b) divided by the waveform value of FIG. 4(c), the output of the divider 45 is as shown in FIG. 4(d). As apparent from the waveform shown in FIG. 4(d), the divider 45 produces a function signal which becomes a minimum value at an in-focus point while the output (an absolute value) increases as the degree of deviation increases. The defocus degree from the in-focus point is obtained in this manner. The output of the amplifier 43 is supplied to a comparator 47, which detects a focusing direction. In other words, when the output level of the line 40 is higher than the output level of the line 42, that is, when an image is formed at the position 4 shown in FIG. 4 in front of the in-focus point and the sharpness at the front position is higher than the in-focus point (in the region on the left hand side of the in-focus point A0 as shown in FIG. 4(a)), the amplifier 43 produces a positive output as shown in FIG. 4(b). Accordingly, the comparator 47 produces a high level output to indicate that the lens 1 should be moved from a near-focus position (a state in which an image is formed in front of the in-focus point) toward a far-focus position (in which an image is formed at the rear of the in-focus point). Conversely, when the output level of the line 40 is higher than that of the line 42, that is, when the image is formed in the region on the right hand side of the in-focus point as shown in FIG. 4(a), the amplifier 43 produces a negative signal as shown in FIG. 4(b). The comparator 47, therefore, produces a low level output to indicate that the lens 1 should be moved from a far-focus position toward a near-focus position. The focusing direction and the defocus degree are detected in the manner described above.

However, the defocus degree is accurately obtainable from the terminal 46 only when the imaging point is within the internal region of the sensor 21 or 23. Accurate determination of the defocusing degree is hardly possible when the image is widely blurred across all of the positions 4, 5 and 6. In view of this, diodes 49 and 50 and a resistor 51 are in a line 52 to obtain a higher level signal from the sharpness signals of the lines 40 and 42. Then, this signal is compared at a comparator 53 with the signal of the line 41 which represents the sharpness of the prescribed focal plane. When the sharpness at the prescribed focal plane is higher than the sharpness degree at the planes before and after the prescribed focal plane, that is, when the imaging plane 2 is located at a point within the internal region of the sensor 21 or 23 or when the defocus degree is of an accurate or reliable value (or an established value), a high level output is produced at a terminal 54. In other words, the defocus degree is obtained as a function when the image is formed in the vicinity of the in-focus point, as shown in FIG. 4(d). However, when the image is formed at a position farther away from the in-focus point (on the left hand side of point A01 or on the right hand side of A02, as shown in FIG. 4(d)), the signal representing the defocus degree is not accurate.

However, even beyond that region, if the image does not blur excessively due to the sensor in the above stated focusing direction, it is still possible to obtain accurate information. Therefore, with the output of the line 41 compared with those of the lines 40 and 42 (A2 and A3 in FIG. 4(a)) by the comparator 53, if the result of the comparison is within the region A01 and A02 as shown in FIG. 4(d), the comparator 53 produces a high level output to indicate that the defocus degree signal produced from the terminal 46 is accurate.

Since it is possible that the outputs of the sensors 21, 22 and 23 become inaccurate due to excessive blur, such an occurrence is detected in the following manner. The outputs of these sensors 21, 22 and 23 are supplied to a circuit consisting of diodes 55-57 and a resistor 58 to obtain a maximum sharpness degree. The signal thus obtained is compared at a comparator 61 with a reference value defined by resistors 59 and 60. If the result of the comparison indicates a sufficient degree of sharpness (if an accurate direction can be detected in the focusing direction), the comparator 61 produces a high level output therefrom. In other words, even where an image is formed at a point beyond the region A01-A02 of FIG. 4(d), if the image is not extremely blurred, accurate information is obtainable in the focusing direction. In such a situation, therefore, the sensor 21, 22 or 23 output (the sharpness signal) is compared with the reference value and, with the exception of extreme blur, a high level output is produced from the comparator 61 and is supplied to an AND gate 62. Meanwhile, when the defocus degree is not of an accurate value, the comparator 53 produces a low level output as mentioned above. Therefore, the AND gate 62 produces a high level output only when accurate information is obtainable in the focusing direction. The high level output of the AND gate 62 is then transmitted to a terminal 63.

In case of extreme blur where no reliable signal or information is obtainable for both the defocus degree and the focusing direction, the output level of the comparator 61 becomes low. The low output is inverted at an inverter 64 to have a terminal 65 produce a high level output to indicate that the signal is not reliable.

The response of every circuit mentioned in the foregoing is slow under a dark condition. In view of this, the brightness signal of the line 30 mentioned in the foregoing is supplied to a voltage control oscillator 67 through an amplifier 66. Under a bright condition, pulses generated by the oscillator 67 are produced at a high frequency as a distance measurement timing signal to allow a distance measuring action to be performed at a high speed. Under a dark condition, low frequency pulses are produced at a terminal 68 to cause the distance measuring action to be performed at a relatively low speed. Furthermore, when the above response is ignorable, the pulses which are produced from the oscillator 67 may be produced at a fixed period irrespective irrespective of the brightness condition. In such a case, the pulses which are used as timing signals can be produced at a fixed period by disconnecting the amplifier 66 from the oscillator 67.

Furthermore, while the lens is being driven, i.e., during a motor driving process on the lens 1, the sensor outputs continuously vary, often resulting in erroneous distance measurement if the above data are produced during the lens driving process. Therefore, during this process, the voltage control oscillator 67 is cleared and rendered inoperative to prevent it from producing erroneous strobing pulses by arranging the drive control unit 14 which will be described later herein to supply a terminal 69 with a signal the level of which becomes high during the lens driving process. With this signal supplied to the terminal 69, distance adjustment on the basis of distance measurement data is not performed. When storage type sensors such as CCD are employed as the sensors 21-23, erroneous storage can be prevented by permitting them to enter a new storage sequence after the level of the above drill signal has become low.

While a distance measuring device of the blur detecting type has been described in the foregoing as an embodiment of the invention, the invention is also applicable to distance measuring devices of completely different types, such as an image deviation type device. In that case, the region for reliable defocus computation is also limited. The accuracy of computation is less when great deviation takes place. The direction determining accuracy is also lower when great defocus occurs, such as excessive blur of the image (for example, in the case of a flat object, etc.). In accordance with the invention, therefore, a signal representing the accurate value of the defocus degree, a signal showing only the accurate focusing direction, and a signal indicating that both the defocus degree and the focusing direction are inaccurate can also be formed in such a device in the same manner as in the embodiment described in the foregoing.

Figure 5:
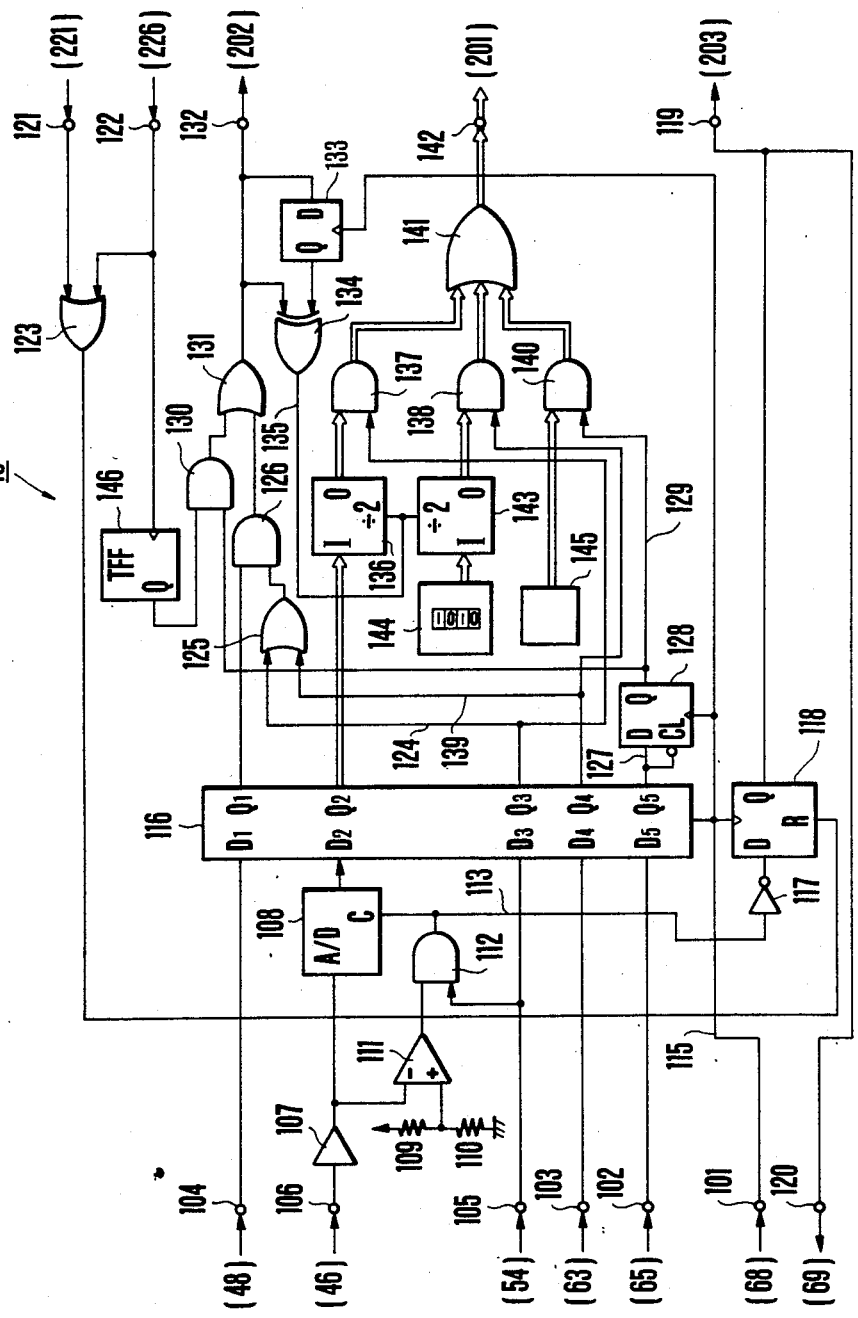
FIG. 5 is a circuit diagram showing, by way of example, a drive instruction unit shown in FIG. 2.

An example of the above stated drive indication or instruction unit 13 is shown in FIG. 5. Referring to FIG. 5, the timing pulses produced from the terminal 68 are supplied from the above focus detection unit 12 to a terminal 101. Where both the focusing direction and the defocus degree are uncertain, the high level output of the above terminal 65 is supplied as an uncertainty signal to a terminal 102. When only the focusing direction is certain, the high level output of the terminal 63 is supplied to a terminal 103 as a certainty signal for the direction. Meanwhile, a direction signal which represents the focusing direction and which is produced from the terminal 48 is supplied to a terminal 104. Furthermore, when the image is within the defocus degree computable region, the high level output of the terminal 54 is supplied to a terminal 105 as a certainty signal for the defocus degree. In that instance, the defocus degree signal which is the output of the terminal 46 is obtained at a terminal 106.

The defocus degree signal which is obtained at the divider 45 and is supplied to the terminal 106 is converted into an absolute value by an absolute value circuit 107 which is composed of, for example, a full wave rectifier circuit and is further converted into a digital value by an A-D converter 108. After that, distance adjustment is performed on the basis of the digitalized value. To simplify the description, the operation subsequent to the detection of the distance measurement data will be described in different cases as follows.

1. When the lens position is detected through the above stated detection of the distance measurement data to be in an in-focus state, that is, within an automatic focusing adjustment region: In this case, the level of the signal which is representative of a defocus degree and is supplied to the terminal 106 is at a value smaller than a given value. Therefore, with the defocus degree compared to the reference level defined by resistors 109 and 110 by a comparator 111, the result of the comparison is a high level output. This high level comparison output and the certainty signal for the defocus degree which comes from the terminal 105 as a high level output thereof are supplied to an AND gate 112. This results in a high level output of the AND gate 112. This high level output of the AND gate 112 is changed to a low level through an inverter 117 and is then impressed on the input terminal D of a D type flip-flop (hereinafter called DFF). This D type flip-flop DDF is set in synchronization with the above pulses from the oscillator 67. However, since at that instant the above low level input is impressed on the input terminal D of the DFF, the output level of the D type flip-flop DFF becomes low and the low output is supplied to a terminal 119. This terminal 119 is connected to a drive signal terminal for the lens drive control unit 14 which will be described later herein. Since the lens 1 is not driven in response to this low level output, the lens 1 is kept in the in-focus state. Furthermore, at that instant, the high level output of the AND gate 112 is transmitted to the A-D converter 108. Furthermore, if the reference level to be defined by the above resistors 109 and 110 is adjustable according to the photo-taking aperture value of the lens 1 in use, the in-focus region can be determined according to the aperture value of the lens 1. In such a case, the focal point setting range (or distance setting range) of the lens 1, which can be regarded as an in-focus range, may become wider depending on the aperture value of the lens 1 to be used. Such an arrangement therefore permits quick completion of a distance adjustment to prevent unnecessary lens adjustment to the in-focus position.

2. When the lens 1 position is not in-focus: In this case, the output level of the comparator 111 becomes low. Therefore, the output level of the AND gate AND 112 also becomes low. The A-D converter 108 then converts the defocus degree signal from the above absolute value circuit into a digital value. Meanwhile, the pulses from the oscillator 67 are supplied to the line 115. The pulses are then transmitted to a latch circuit 116 which consists of a plurality of D type flip-flops DFFs. In synchronization with the pulses, the latch circuit 116 latches the signals which have been supplied to the input terminals D1-D5 thereof as distance measurement data. Furthermore, the above D type flip-flop DDF 118 is set by the pulses and produces a high level output from the output terminal Q thereof. The high level output of the D type flip-flop DFF 118 is then transmitted to the lens drive unit through a terminal 119 to cause the lens 1 to be driven. The high level output of the D type flip-flop DFF 118 is also transitted to the oscillator 67 to render it inoperative, so that new data is inhibited from being supplied to the latch circuit 116 while the lens 1 is being driven.

2. (a) When the defocus degree is of a reliable (or accurate) value while the lens 1 position is not in-focus: As has been described in the foregoing, a high level output representing certainty of the defocus degree is supplied from the terminal 54 to the terminal 105 in this situation. Low level inputs are supplied to the terminals 102 and 103 from the terminals 65 and 63. This causes the level of input D3 to become high and the level of output Q3 of the latch circuit 116 to become high in synchronization with the above pulses and a line 124 produces a high level output. The output level of an OR gate 125 also becomes high to open an AND gate 126. At that time, the uncertainty signal of the terminal 102 is at a low level as mentioned above; the level of output Q5 of the latch circuit 116 is therefore low and the signal level of line 127 is also low. Accordingly, since the level of an inverted, clear line 129 is low, a D flip-flop 128 produces a low level output from its output terminal Q. An AND gate 130 is therefore closed. With the AND gate 126 opened as mentioned above, a focusing direction signal which is supplied from the terminal 104 to the latch circuit 116 is transmitted to a terminal 132 through an OR gate 131. This signal gives instruction to drive the lens 1 in that direction.

There is provided a D flip-flop 133 for storing a signal representing the focusing direction detected through a previous distance measuring action. This flip-flop 133 is clocked by pulses which are produced from the pulse oscillator 67 and are received as a signal from the line 115.

When the direction instructed is unchanged from the previously instructed direction, the signal of the terminal 132 and the output Q of the flip-flop 133 coincide with each other irrespective of the direction. Therefore, an exclusive OR gate 134 produces a low level output to a line 135. Therefore, a divider circuit 136, which produces one-half of the input thereof, allows the whole input to pass therethrough without dividing it by two. Meanwhile, the high level signal of the above line 124 opens an AND gate 137. (At that time, the level of the signal of the terminal 103 is low resulting in the low level of the output Q4 of the latch circuit 116. The level of a line 139 is, therefore, low, closing an AND gate 138. Furthermore, the low level of the above line 129 also causes another AND gate 140 to close). With the AND gate 137 thus being opened, a terminal 142 receives instruction through an OR gate with respect to the defocus degree required. When the defocus degree $\phi$ is of an established value, the defocus degree is thus converted into a signal value by the A-D converter 108. A defocus degree signal latched at the latch circuit 116 is produced at the terminal 142 through the output terminal Q2 of the latch circuit 116. Meanwhile, a focusing direction signal is produced from the terminal 132. The drive control unit 14, which will be described later herein, then causes the lens 1 to be driven to an extent corresponding to the defocus degree in the direction determined by the focusing direction signal. With the lens 1 driven as much as the defocus degree, the line 121 produces a high level output in the form of a single pulse. This output of the line 121 resets the D type flip-flop DFF 118 to lower the level of a drive signal from the terminal 119. The low level drive signal brings the lens driving motor of a lens drive circuit to a stop. With the D type flip-flop DFF 118 reset, the oscillator 67 again begins to operate. With the operation of the oscillator 67 resumed, the result of distance measurement detected through the circuit arrangement shown in FIG. 3 is again latched at the latch circuit 116. When the lens 1 is driven to an in-focus position, the lens 1 is kept in that position, as mentioned in paragraph 1. above. When the lens driving action fails to bring the lens 1 to an in-focus position or the object to be photographed happens to move, the processes described above are once again performed to drive the lens 1. Thus, the distance measuring action and the lens driving action, depending on the result of the distance measuring action, are repeated until the lens 1 is brought to an in-focus position.

Input terminals D1, D3, D4 and D5 of the above latch circuit 116 are one-bit input terminals while another input terminal D2 is set up with a number of bits depending on the output of the A-D converter 108. Likewise, the output terminals Q1, Q3, Q4 and Q5 of the latch circuit 116 are one-bit output terminals while another output terminal Q2 is set up with the same number of bits as the input terminal D2.

Figure 6:
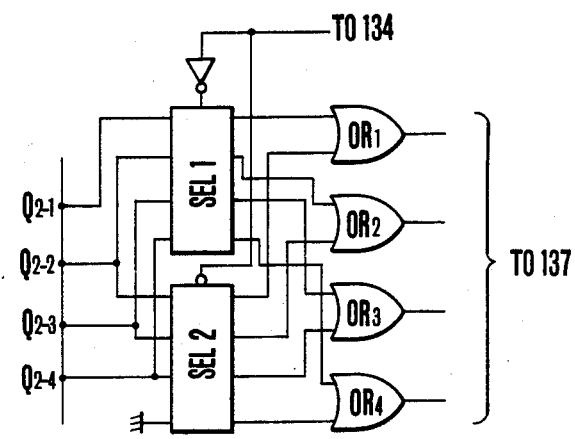
FIG. 6 is a circuit diagram showing, by way of example, a dividing circuit shown in FIG. 5.

Referring to FIG. 6, the above divider circuit 136 consists of data selectors SEL1 and SEL2 and OR gates OR1–OR4. When the output level of the exclusive OR gate 134 is low, as mentioned in the foregoing, the selector SEL1 is selected through an inverter. Then the outputs Q2-1–Q2-4 of the latch output terminal Q2 are produced from the OR gates OR1–OR4. When the output level of the OR gate 134 is high, the selector SEL2 is selected and the OR gate OR4 produces a low level output while outputs Q2-4–Q2-2 are produced from the OR gates OR3–OR1. With the selector SEL2 selected, the outputs of the latch circuit 116 are thus produced from the divider circuit 136 after they are shifted by one bit, i.e., after they become one-half. In FIG. 6, the outputs of the latch circuit 116 output terminal Q2 are shown as 4 bits including a first bit Q2-1 through a fourth bit Q2-4. However, the number of bits is not limited to thus number and a divider circuit 143 can also be arranged likewise. While the AND gates 137, 138 and 140 and the OR gate 141 are solely shown in FIG. 5 for the sake of simplification of the illustration, they are actually provided in greater numbers corresponding to the number of output bits of the circuits 136, 143 and 145.

Figure 7:
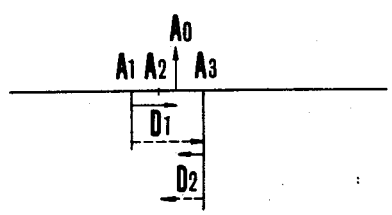
FIG. 7 is an illustration of the operation of the circuit shown in FIG. 5.

With the divider circuit 136 arranged as described above, when the focusing direction signal from the line 132 shows a direction different from the direction shown by the previous focusing direction signal held at the flip-flop 133 during the operation described above, the output level of the exclusive OR gate 134 becomes high. Then, the output Q2 of the latch circuit 116, i.e., the defocus degree, is reduced to one half by the divider circuit 136 to prevent oscillation at a point in the vicinity of the in-focus point. More specifically, when the lens 1 is driven by the operation mentioned above to move to the extent of the defocus degree in the instructed direction, or when the lens 1 is driven, for example, from a position A1 in the direction of the arrow as much as a defocus degree D1 as shown in FIG. 7, there is the possibility that the lens 1 might be overshot and might be moved to a point A2 which is beyond an in-focus A0. Such an overshoot results in a focusing direction different from the previous direction in the process of detecting the defocus degree and the focusing direction. In that case, the lens 1 is driven as far as a defocus degree D2 in the reverse direction, as shown in FIG. 7. Then, a second overshoot brings the lens 1 to another position A3. Therefore, if the lens 1 is driven as far as the defocus degree in the vicinity of the in-focus point, the lens 1 cannot be readily adjusted to the in-focus point A0 due to such overshooting. In accordance with the present invention, therefore, when a focusing direction differing from the focusing direction of the previous instruction is obtained through the process of distance measurement, that is, when overshooting takes place, a high level output is produced from the exclusive OR gate 134 to actuate the divider circuit 136 and then a driving degree signal which corresponds to one half of the obtained defocus degree is produced from the terminal 142. Accordingly, the lens 1 is driven to an extent corresponding to one half of the defocus degree to prevent the above overshoot for quick adjustment of the lens 1 to the in-focus position thereof.

2. (b) When only the focusing direction is established while the lens 1 is not in focus: In this instance, the level of the terminal 54, or that of the terminal 105, becomes low; the level of the terminal 63, or that of the terminal 103, becomes high; the level of the terminal 65, or that of the terminal 102, becomes low as mentioned in the foregoing. The level of the output Q3 of the latch circuit 116 becomes low. The level of the output Q4 becomes high and that of the output Q5 low. Accordingly, the level of the line 124 becomes low, that of the line 139 high and the levels of lines 127 and 129 low. This demands that the lens 1 be driven to a given distance in the focusing direction thus determined. The focusing direction is determined as follows. The output level of the OR gate 125 is caused to become high by the high level output of the line 139. Then the focusing signal, which is latched at the latch circuit 116 and is produced from the output terminal Q1 thereof, is produced at a direction indication terminal 132 through the AND gate 126 and the OR gate gate 131.

Furthermore, since the levels of the lines 124 and 129 are low and the level of the line 139 high, the AND gates 137 and 140 are closed and the AND gate 138 opens. Therefore, through the AND gate 138, a constant setting element 144 which is composed of a register in which a digital value 1010, for example, corresponding to a predetermined constant is set supplying this digital value to the terminal 142 as described in the foregoing. In this case, therefore, the lens 1 is driven in the focusing direction indicated, to a given extent, based on data representing a given driving extent set at the constant setting element 144. After the lens 1 is driven a given extent in this manner, the high level output of the terminal 121 is supplied in the form of a single pulse stopping the lens driving action. Again, the result of distance measurement is latched at the latch circuit 116. Then, the lens 1 is driven once again according to the result of distance measurement. The lens 1 is thus repeatedly driven to a given extent each time until the condition described in paragraph 2. (a) above is attained. Then, the embodiment performs the operation as described in paragraph 2. (a).

As for the predetermined driving extent to be set by the above constant setting element 144, it is set at a value that does not often cause the lens 1 movement to exceed an established defocusing range and it also does not exceed a range for establishing the focusing direction. For example, the driving extent is set at 2 mm. Furthermore, the constant may be adjusted according to the aperture value of the lens 1 or the focal length thereof. In driving the lens 1 according to the data from the constant setting element, if the output level of the exclusive OR gate 134 is high, a divider circuit 143 is actuated, driving the lens to an extent which is one half of the above stated constant.

2. (c) When both the focusing direction and the defocus degree are uncertain while the lens 1 position is not in focus: The result of distance measurement by the circuit shown in FIG. 3 causes the levels of the terminals 105 and 103 to become low and that of the terminal 102 high. As a result, the levels of the lines 124 and 139 become low while that of the line 127 becomes high. The uncertainty of the focusing direction sometimes momentarily and accidentally results from vibration of the hands or the like. However, in case of intrinsic uncertainty, a search is conducted over the whole region of the lens 1 to adjust the lens 1 position to an in focus point which is greatly deviated from a normal in-focus position. However, if such searching action begins even in response to a momentary vibration, such a searching action is not only detrimental to operability but also results in the loss of an in-focus point to which the lens 1 has already been adjusted. To solve this problem, there is provided a stabilizing circuit which is arranged in the following manner. When the level of the output Q5 of the latch circuit 116 is caused to become high by the high level output of the terminal 102 and thus results in the high level of the line 127, the D type flip-flop DFF 128 is released from a reset state. However, since the level of the output Q of the D type flip-flop DFF 128 still remains low under this condition, the level of the line 129 does not become high. Since the levels of the lines 124 and 139 are also low, the AND gates 126 and 130 are closed. Therefore, the level of the terminal 142 also becomes low. Furthermore, since the AND gates 137, 138 and 130 are also closed, a signal of zero drive demanding quantity information is produced at the terminal 142 through the OR gate 141. Therefore, the lens 1 is not driven. This causes the line 121 to produce a high level output for a short period of time therefrom, as will be described later. This high level output of the line 121 comes through the OR gate 123 to reset the D type flip-flop DFF 118. With the D type flip-flop DFF 118 reset, the oscillator 67 begins to operate, as described in the foregoing. The result of distance measurement performed by the circuit shown in FIG. 3 is again set at the latch circuit 116. Assuming that the level of the output Q5 of the latch circuit 116 produced as a result of a second distance measurement is low, the D type flip-flop DFF 128 is cleared and the level of the output Q of the D type flip-flop DFF 128 is kept at a low level. Therefore, the operation described in paragraph 2. (a) and 2. (b) above is performed in accordance with a second distance measurement. Where the level of the output Q5 of the latch circuit 116 is high despite the second distance measurement, a high level output is produced from the output terminal Q of the D type flip-flop DFF 128. Therefore, the level of the line 129 becomes high only when the first and second distance measurements consecutively show that both the defocus degree and the focusing direction are uncertain.

When the output level of the line 129 becomes high in this manner, the AND gate 140 is opened to have the predetermined value which is set at the constant setting circuit or element 145 produced from the terminal 142, as a driving extent required. Then, the lens 1 is driven to the above predetermined extent in the direction determined by the focusing direction signal at the terminal 132.

The predetermined extent mentioned above is larger than the value set at the above circuit 145 and is set at a value that permits a quick search over the whole lens 1 driving range to find without fail an in-focus point, i.e., without exceeding a discernible direction range.

With the lens 1 driven to the predetermined extent as mentioned above, the line 121 produces a high level output for a short period of time stopping the lens driving action. Then, the result of distance measurement performed by the circuit shown in FIG. 3 is again latched at the latch circuit 116. Therefore, when the lens 1 moves to the condition shown in paragraph 2. (b), the operation described in paragraph 2. (b) is performed thereafter. Where the lens 1 still remains in the condition of paragraph 2. (c) despite the lens 1 driving process, the lens 1 driving action to a predetermined extent is repeated until the condition of the lens 1 shifts to the condition of paragraph 2. (a) or 2 (b). Furthermore, under the conditions of 2. (c), the focusing direction is inaccurate and, therefore, the lens 1 might be driven in a direction opposite to the in-focus direction. In such a case, an end signal, which will be described later herein, is supplied to the terminal 122 when the lens 1 is thus driven to limit an extent. Since a T flip-flop 146 is inverted by this end signal, the output of the AND gate 130 is inverted to invert the focusing direction signal supplied to the terminal 132. Therefore, when the lens 1 is brought to the predetermined extent limit by the lens 1 driving action, the lens 1 driving direction is reversed moving it toward an in-focus point. Therefore, the lens 1 is shifted to the condition of 2. (a) or 2. (b) without fail with the lens driving action repeatedly performed to the predetermined extent.

Figure 8:
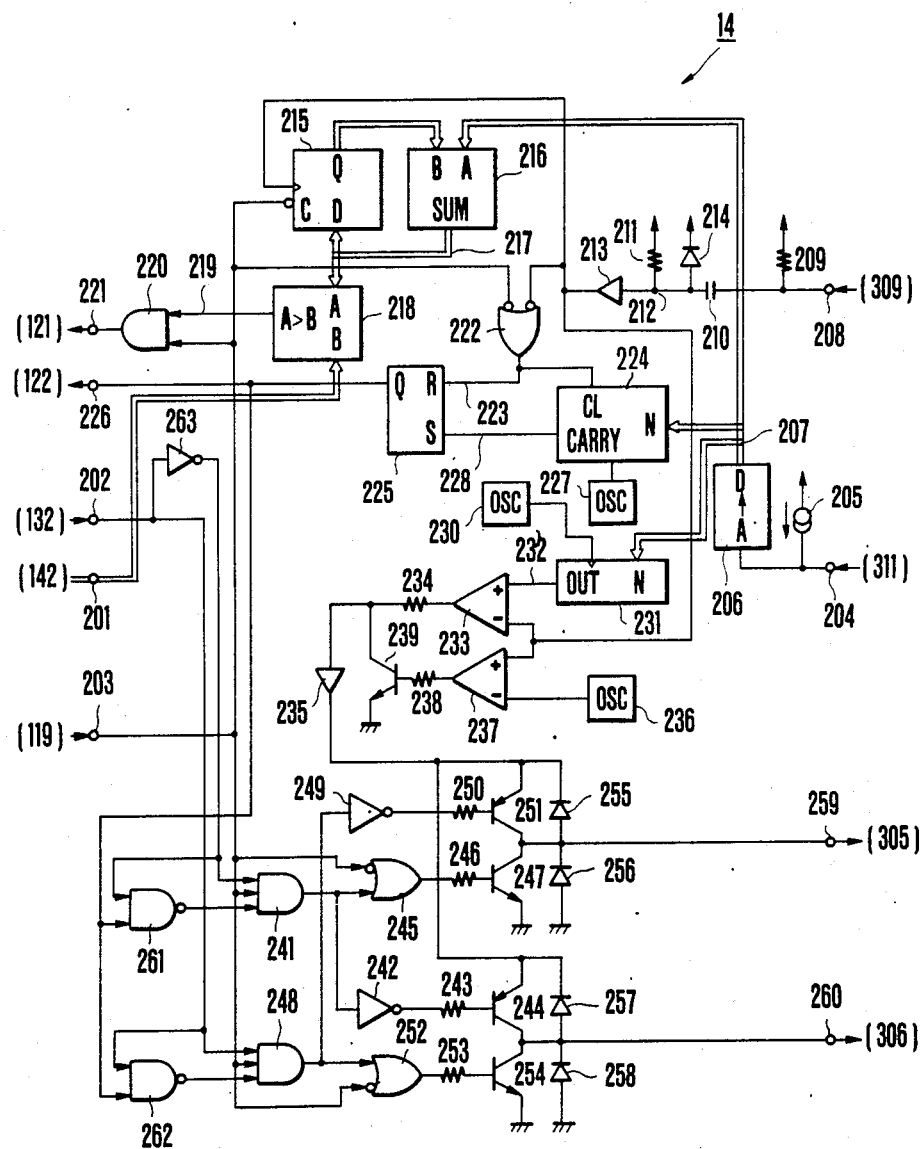
FIG. 8 is a circuit diagram showing, by way of example, a drive control unit shown in FIG. 2.
Figure 9:
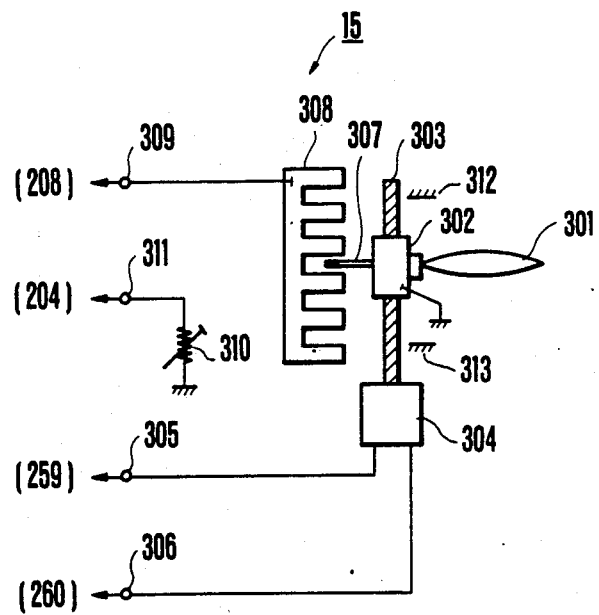
FIG. 9 is a schematic illustration showing by, way of example, a drive unit shown in FIG. 2.

Referring now to FIG. 8, one example of the above stated drive control unit 14 is arranged as follows. This drive control unit 14 has the lens 1 driven to an extent corresponding to the defocus degree (the output of the terminal 142) supplied from the drive indication or instruction unit 13 to a terminal 201, in the driving direction indicated by the focusing direction signal (the output of the terminal 132) supplied to a terminal 202, only for a period during which the drive signal (the output of the terminal 119) supplied to a terminal 203 remains at a high level. This unit 14 includes a lens drive monitor circuit portion. This portion has a monitor terminal 208. To this terminal 208 is connected a comb-shaped contact, which is shown in FIG. 9. This comb-shaped contact turns on and off every time the lens 1 is moved a predetermined extent. The on and off condition of the comb-shaped contact is detected by circuit elements including registers 209 and 211, a capacitor 210 and an amplifier 213. These circuit elements form a pulse forming circuit which produces a pulse signal every time the comb-shaped contact turns on. Within this pulse forming circuit, the capacitor 210 and the register 211 form a time constant circuit, which prevents the adverse effect of chattering, when chattering takes place at the comb-shaped contact. A diode 214 prevents the potential of a point 212 from becoming an abnormally high potential. The pulse forming circuit normally produces a high level output and produces a low level output when the above comb-shaped contact turns on for a period of time corresponding to the time constant defined by the above circuit. The above pulse signal is formed by these high and low level outputs of the pulse forming circuit.

The unit further includes a computing circuit portion in which a line 207 receives a digital value corresponding to a defocus degree (focus shifting extent) resulted from a lens 1 driving extent when pulses are produced from the above pulse forming circuit, as will be described later herein. In other words, since one pulse is formed and produced from the pulse forming circuit every time the comb-shaped contact turns on, that is, every time the lens 1 moves as much as the spacing distance between one comb tooth and another, the extent of the lens 1 movement (or focus shifting extent) which takes place every time one pulse is produced from the pulse forming circuit can be predetermined. Therefore, a digital value (hereinafter called a defocus degree/pulse value), which corresponds to the focus shifting extent per pulse, is supplied from the line 207 to a circuit which will be described below.

The digital value from the line 207 is impressed on an input terminal A of an adder 216. The adder 216 then adds together the digital value and a signal received at another input terminal B thereof. A sum thus obtained is produced from a line 217. The sum value from the line 217 is supplied, in synchronization with the pulses from the pulse forming circuit, to a register 215 which consists of a D type flip-flip DFF with a plurality of bits. The output of this register is impressed on the input terminal B of the above adder 216. Such being the arrangement, the lens 1 movement extent (defocus degree) per pulse from the line 207 is accumulated at the register 215 every time a pulse is produced from the pulse forming circuit. The register 215 thus stores a digital value which corresponds to (number of pulse producing times)×(defocus degree per pulse), i.e, a defocus degree up to that point in time. A magnitude comparator 218 compares the above defocus degree signal, which is impressed on an input terminal B thereof, with a signal impressed on another input terminal A thereof. Since a digital value corresponding to the lens 1 movement extent (a defocus degree) up to that time is stored at the register 215 as mentioned above, when the lens 1 is moved to the extent of the defocus degree computed by the circuit shown in FIG. 3 during the lens 1 driving process, the input A of the comparator 218 becomes larger than the input B thereof. This results in a high level output of a line 219. The terminal 203 which is connected to the terminal 119 produces a high level output Q of the D type flip-flop DFF 118 during the lens 1 driving process, as mentioned in the foregoing. Therefore, when the lens 1 driving process to the defocus degree come to an end, as mentioned above, an AND gate 220 produces a high level output. The output level of the terminal 119 then changes from a high level to a low level ending the lens 1 driving action. Furthermore, the register 215 is reset when the level of the driving signal of the terminal 203 is low, that is, the register is clear when the lens 1 is not driven.

Further included in the unit is a lens limit detection circuit portion, which is arranged as follows. The output level of the terminal 203 is low when the lens 1 is not driven because the level of the output Q of the D type flip-flop DFF shown in FIG. 5 is low, as mentioned above. When the lens 1 is not driven, therefore, the level of an output line 223 of an inversion input OR gate 222 becomes high to reset a frequency divider 224 and an RS flip-flop 225. Accordingly, the level of the output Q, i.e., the level of an end signal terminal 226 of the RS flip-flop 224 becomes low. During the lens 1 driving process, on the other hand, the output level of the terminal 203 becomes high. This causes the output level of the inversion input OR gate to become low unless the output level of the amplifier 213 of the above pulse forming circuit changes to a low level (that is, unless the comb-shaped contact turns on in relation to lens 1 movement). As the output level of the OR gate 222 thus stay low, the frequency divider 224 is released from a cleared state and begins to count the pulses from an oscillator 227. When a number of pulses designated by the signal of a point 207 have been thus counted, the frequency divider 224 causes the level from a line 228 to become high and produces a carry output. In other words, the carry output is produced when no pulse comes from the pulse forming circuit for a period of time longer than a predetermined length of time after receipt of the driving instruction for the lens 1. With the carry output thus produced, the RS flip-flop 225 is set to produce a high level signal at the terminal 226 to show that a lens 1 limit has been reached. More specifically, in order to stop the lens 1 upon arrival thereof at the lens limit, the comb-shaped contact no longer performs the on-and-off action thereof and no pulse is produced from the pulse forming circuit thereafter. In that situation, therefore, the frequency divider 224 produces the carry output having a high level signal produced at the terminal 226 to indicate the limit, so that the operation described in paragraph 2. (c) above can be carried out accordingly. When the lens 1 has not reached the limit, the comb-shaped contact, of course, turns on and off within the predetermined period of time. The output level of the amplifier 213 then changes to a low level to make the output level of the inversion input OR gate 222 high. This high level output clears the frequency divider 224. Therefore, no carry output is produced and, therefore, no high level output is produced at the terminal 226.

The arrangement detecting lens 1 limit by a change or no change in the pulse signal produced in relation to the lens 1 driving process permits the drive monitoring operation to be adequately accomplished with the use of only a single signal line. Furthermore, there is the possibility that the defocus degree (focus shifting extent) relative to the extent of lens 1 movement fluctuates with variation in the zooming condition and design of the lens 1. To make the defocus degree per unit time always unvariable, the extent of lens 1 movement relative to a given defocus degree (or a focus shifting extent) must be varied according to the zooming condition and the type of lens 1 used. This necessitates adjusting the extent of lens 1 movement per unit time according to the zooming condition, etc. As a result of this arrangement, the period or cycle of pulses produced from the pulse forming circuit varies. Therefore, if the above-mentioned time for time count by the frequency divider 224 is not variable, there would arise such inconvenience that when the pulse period or cycle becomes longer, for example, no pulse is produced within the above stated period of time. In such a case, a limit detecting action would be performed before the lens 1 has come to the limit. In accordance with the invention, therefore, a signal representative of a defocus degree per pulse from the line 207 is supplied to the frequency divider 224. With this signal supplied, the frequency dividing ratio of the frequency divider 224 is varied to change the count time as required. For example, where the defocus degree becomes N when the extent of lens 1 movement per unit time is D and one pulse is produced when the lens 1 moves as much as the extent D, the limit detection can be accurately accomplished by setting the time for time count by the frequency divider 224 at a length of time $A + \alpha$ which is slightly longer than the unit time A. However, assuming that the defocus degree is adjusted to become N when the extent of movement becomes D/2, if the defocus degree per unit time is to be retained at N, the extent of movement per unit time must be multiplied by one half to make it D/2. Then, the pulse produced per unit time A becomes one half pulse. As a result, no pulse would any longer be produced within the time counting time A and then the lens 1 would be considered to have reached a limit before it actually reaches the limit. In that instance, therefore, the time count time must be doubled to make it 2A. To solve this problem in accordance with the invention, the frequency dividing ratio of the frequency divider 224 is varied to adjust the above time according to the signal from the line 207. For example, the frequency dividing ratio is varied as the defocus degree per pulse becomes N or becomes 2N.

There is also provided a circuit portion for controlling a lens 1 driving force. When the driving force and speed of the motor vary with the lens 1 or when the interval of pulses relative to the lens 1 varies, this circuit portion serves to compensate for such variations. In this circuit portion, the output of a reference oscillator 230 is frequency divided at a variable frequency divider 231 by the signal of the line 207, which is the signal of (defocus degree)/(one pulse interval). The frequency divider 231 is provided for the purpose of forming pulses of a reference period or cycle. The phase of the pulses of the reference cycle and that of the pulses from the pulse forming circuit, mentioned in the foregoing, are detected and the driving speed of the motor is kept constant by a circuit, which will be described later herein. As described in the foregoing, in order to make the defocus degree per unit time always unvariable despite changes in the defocus degree associated with the extent of lens 1 movement or shifting of lens 1 position, irrespective of zooming conditions, etc., the extent of lens 1 movement per unit time, or the lens 1 driving speed must be adjusted. For this purpose, in accordance with the invention, a signal which represents a defocus degree per pulse from the above line 207 is supplied to the frequency divider 231 to control the frequency dividing ratio thereof. More specifically, assuming that the defocus degree per pulse is N, the cycle of the frequency divider 231 is A and under this condition the motor is running at a speed S, the speed S must be adjusted to one half S when the defocus degree per pulse becomes 2N. Without such an adjustment, it is hardly possible to retain the defocus degree per unit time at a given constant value N. Therefore, the above reference cycle must be adjusted to 2A and the motor must be operated in synchronization with the pulses of the cycle 2A. To attain this purpose, the signal of the line 207 which represents the above defocus degree per pulse is used to control the frequency dividing action of the frequency divider 231 for adjustment of the cycle of the reference pulses. The reference pulses are applied, together with the pulses which are in association with the actual lens 1 movement and are obtained from the multiplier 213, to a phase comparator 233 which has a phase locked loop and is provided with a low-pass filter for the output thereof. The comparator 233 produces a high level output when the actual lens associated pulses are slower than the reference pulses and a low level output when the latter pulses are slower than the former. The output of the comparator 233 is transmitted through an amplifier 235 to increase or decrease the power of the motor until a value which gives about the same pulses as the reference pulses is obtained through a feedback process. This arrangement prevents variations in response speed and the inconvenience resulting from the above erroneous action of the limit detecting circuit portion. An oscillator 236 is a limiting oscillator which prevents the lens associated pulses from having excessively short intervals and from becoming too quick in distinguishing them from chattering or from becoming almost uncontrollable. A phase comparator 237 with a phase locked loop which is provided with a low-pass filter for the output thereof compares the lens associated pulses with the output pulses of this oscillator 236. When the lens associated pulses are abnormally quick, the comparator 237 produces a high level output which turns on an npn transistor 239 through a resistor 238. With the transistor 239 turned on, speed control (stabilizing control over the focal plane shifting extent) by the above phase comparator 233 is restricted to prevent the lens associated pulses from becoming too quick and thus to prevent an erroneous operation from resulting therefrom. In other words, with the transistor 239 turned on, the input level of the amplifier 235 is lowered to restrict the motor power and to lower the motor speed, so that the driving system can be adjusted for different lenses 1.

Also provided in the unit is a motor drive circuit portion in which, when the lens 1 is not driven, the low level output of the terminal 203 is impressed to make the output level of a gate 241 low. The low level output of the gate 241 causes the output level of an inverter 242 to become high. The high level output of the inverter 242 turns off a pnp transistor 244 through a resistor 243. Meanwhile, a low level inversion input of an OR gate 245 results in a high level output thereof, which turns on an npn transistor 247 through a resistor 246. Since the output level of another AND gate 248 also becomes low, the output level of an inverter 249 becomes high turning off a pnp transistor 251 through a resistor 250. An inversion OR gate 252 also has a low level inversion input and thus produces a high level output turning on an npn transistor 254 through a resistor 253. With the transistors 247 and 254 turned on and by virtue of diodes 255-258, prevent the transistors 247 and 254 from being damaged by a back electromotive force of the motor, motor terminals 259 and 260 are short-circuited to apply a brake (electromagnetic brake). Since the lens 1 has not reached the limit, the output Q of the RS flip-flop 225 is at a low level. Therefore, the output levels of NAND gates 260 and 261 are high.

Assuming that the output level of the terminal 203 becomes high, driving the lens 1 when the output level of the driving direction terminal 202 is high, the output level of the AND gate 248 becomes high. The output level of the OR gate 252 also becomes high. The transistor 254 turns on. A low output level of the inverter 249 then turns on the transistor 251. Furthermore, since the output level of the AND gate 241 is low, the output level of the OR gate 245 is low. Accordingly, the transistor 247 turns off. Furthermore, since the output level of the inverter 242 is high, the transistor 244 also turns off. As a result, the output (positive) of the amplifier 235 is applied to the terminal 259. Meanwhile, another terminal 260 is grounded by the transistor 254 causing the motor to drive the lens 1 in the desired direction. The output level of a NAND gate 262 becomes low stopping the motor from driving when the lens 1 reaches the limit.

When the lens 1 is to be driven in the opposite direction, when the level of the terminal 203 is high while that of the terminal 202 is low, the output level of the AND gate 241 becomes high. The output level of the OR gate 245 becomes high turning on the transistor 247. Meanwhile, the output of the inverter 242 becomes low turning on the transistor 244. Furthermore, with the output level of the AND gate 248 becoming low, the output level of the OR gate 212 also becomes low turning off the transistor 254. Furthermore, with the output level of the inverter 249 being at a high level, the transistor 251 turns off. As a result, the output (positive) of the amplifier 235 is applied to the terminal 260 while the transistor 247 turns on grounding the terminal 259. Then, the motor drives the lens 1 in a direction opposite the direction mentioned in the foregoing. Upon arrival of the lens 1 at the limit, the output level of the NAND gate 261 becomes low stopping driving of the motor. The brake is applied in the same manner as in the above case when the driving action is stopped by the low output level of the driving terminal 203.

The drive unit 15, which has been mentioned in the foregoing, is arranged, for example, as shown in FIG. 9. The arrangement shown in FIG. 9 corresponds, for example, to an interchangeable lens for a single-lens reflex camera. In this example, a photo-taking lens 301 has its position shifted by a motor 304 under the control of terminals 305 and 306 through a reduction mechanism 302 and 303. The same focusing mechanism can be attained by not only arranging the whole lens assembly to be movable forward but also to make a front lens or part of other lens groups movable. In this case, the above lens 301 associated pulses are produced at a motor terminal 309 as the lens 301 position is shifted with a brush 307 operating in association with the lens 301 and grounded and particularly with the brush 307 cooperating with a comb-shaped electrode pattern 308. The unit is provided with a resistor 310 which has its resistance value used for setting information on (defocus degree)/(pulse interval). This information is produced at a terminal 311. The information from the terminal 311 is converted into a digital value by the A-D converter 206 in the same manner as has been described in the foregoing. Furthermore, if the resistor 310 is operable in relation to the zooming action of a zoom lens, the value of the above stated information can be adjusted according to the zoom ratio of the lens 301. Such an arrangement enables automatic transmittal of changes in the extent of the lens 301 movement due to zooming and the defocus degree (focus shifting extent) to the aforementioned circuits which are connected to the line 207, so that the focus shifting extent per unit time will be unvariable.

Further included in the unit are stop members 312 and 313 which stop the forward and backward movements of the lens 301. When the lens 301 abuts one of the stop members 312 and 313, the stopping action is detected by the limit detecting circuit portion of the drive control unit 14 shown in FIG. 8. Upon detection, the lens 301 is no longer driven, so that the limit control can be accomplished without recourse to additional switches or the like.

As has been described in the foregoing, the automatic focusing device according to the invention is capable of promptly bringing the lens 301 into an in-focus position either by driving the lens 301 according to a defocus degree or by driving it to a fixed extent according to the accuracy of the defocus degree detected and that of the focusing direction signal. Furthermore, also as described in the foregoing, if an overshoot once happens, the defocus degree obtained is reduced and the lens 301 is then driven according to the reduced defocus degree. Besides, in driving the lens 301 to an extent corresponding to the defocus degree obtained, the lens 301 is driven to that extent through an adding operation. Therefore, the invention not only effectively prevents hunting but also permits defocus degree control with a simple arrangement. Furthermore, in the embodiment shown in FIG. 8, a computation circuit is formed by the adder 216 and the magnitude comparator 218. The same effect, however, can be obtained by replacing this circuit with a subtraction circuit, which may be arranged as follows. Every time a pulse is produced from the pulse forming circuit, the subtraction circuit is used to subtract the digital value obtained from the line 207 from the defocus degree produced from the terminal 201 and then a high level output is produced from the terminal 221 when the subtraction result is zero.

Also, the computation of the defocus degree performed by the divider 45 of FIG. 3 may be replaced with simple computation performed by addition and subtraction.

In the embodiment shown in FIG. 6, the lens associated pulses are produced by a mechanical contact method using the brush 307 and the comb-shaped electrode 308. However, the invention is not limited to this arrangement, which may be replaced with some non-contact arrangement that uses, for example, a photo-interrupter, an electromagnetic pick-up arrangement, etc.

What we claim:
1. An automatic focusing device, comprising:
   (a) a focus detection circuit for detecting a focusing direction and a driving amount for a lens; and
   (b) a lens driving circuit, said driving circuit having a first mode to drive a lens in the focusing direction detected by said detection circuit as much an amount as corresponds to the detected lens driving amount, said driving circuit also being shifted to a second mode in which the lens is driven in the detected focusing direction by a prescribed finite amount determined by the detected lens driving amount and smaller than said driving amount when the detected focusing direction is different from the focusing direction detected at a preceding time.
2. An automatic focusing device, comprising:
   (a) a focus detection circuit, said detection circuit detecting an in-focus state and a driving amount for a lens, said detection circuit producing a signal for shifting the lens to an in-focus position by said detected lens driving amount;
   (b) a lens driving circuit, said driving circuit shifting the lens to the in-focus position based on said signal from said detection circuit; and
   (c) a control circuit for controlling said lens driving circuit, when the lens is driven by said lens driving circuit and the lens passes through and overruns the in-focus position, said control circuit controls the lens driving circuit to drive the lens in an in-focus direction by a prescribed finite amount determined by and smaller than the detected driving amount of the lens corresponding to the signal produced from the focus detection circuit to shift the lens to the in-focus position.
3. An automatic focusing device according to claim 1 or 2, wherein said finite amount is approximately one-half of the detected lens driving amount.

* * * * *